United States Patent
Wang et al.

[11] Patent Number: 6,130,863
[45] Date of Patent: Oct. 10, 2000

[54] SLIDER AND ELECTRO-MAGNETIC COIL ASSEMBLY

[75] Inventors: Yugang Wang, Milpitas; Jimmy Jyhming Shen, Fremont; Howie Trang, San Jose; Marcus H. Barnes, Felton, all of Calif.

[73] Assignee: Read-Rite Corporation, Milpitas, Calif.

[21] Appl. No.: 09/005,913

[22] Filed: Jan. 12, 1998

Related U.S. Application Data

[63] Continuation-in-part of application No. 08/965,340, Nov. 6, 1997, Pat. No. 5,978,319.

[51] Int. Cl.$^7$ .................................................. G11B 11/00
[52] U.S. Cl. ............................................. 369/13; 360/114
[58] Field of Search .................... 369/13, 44.14, 369/44.23, 44.26, 44.39, 118, 110, 14, 112; 360/114, 59, 126, 123, 102, 103

[56] References Cited

U.S. PATENT DOCUMENTS

| | | | |
|---|---|---|---|
| 5,072,324 | 12/1991 | Lin et al. | 360/126 |
| 5,615,183 | 3/1997 | Ishii | 369/13 |
| 5,689,478 | 11/1997 | Ishii et al. | 369/13 |
| 5,703,839 | 12/1997 | Ishii | 369/13 |
| 5,903,525 | 5/1999 | McDaniel et al. | 369/13 |

*Primary Examiner*—Ali Neyzari
*Attorney, Agent, or Firm*—Robert King; Samuel A. Kassatly

[57] ABSTRACT

A slider supports or stores a device such as an electro-magnetic coil assembly, an electronic component, or an optical component, and includes an underside formed of a taper, a flat or patterned air bearing surface, and a recessed region. The recessed region receives the device without significantly affecting the aerodynamic performance of the air bearing surface, and is located at the slider trailing edge. The weight of the device can be compensated by the suspension gram load. In certain applications the device underside is recessed relative to the air bearing surface, while in other application the device underside is flush with the air bearing surface. The device includes an electrical conductor that extends along the recessed region. According to another embodiment, the slider includes a vertical channel located in a front side of the slider that extends along the entire slider depth. The vertical channel accommodates the electrical conductor of the device. One or more horizontal channels may optionally be formed in the slider front side, at an angle relative to the vertical channel, such that at least one of these horizontal channels is connected to the vertical channel. According to yet another embodiment, the slider is modularly formed, and has an upper section, a lower section secured to the upper section, wherein the upper slider section includes a taper at a leading edge, and a flat or patterned air bearing surface. A recessed region is defined by a trailing edge of the upper slider section, and the lower slider section.

15 Claims, 11 Drawing Sheets

SLIDER AND ELECTRO-MAGNETIC COIL ASSEMBLY

CROSS-REFERENCE TO RELATED APPLICATION

The present patent application is a continuation-in-part of the patent application titled "Electro-magnetic Coil Assembly", Ser. No. 08/965,340, filed on Nov. 6, 1997, by Yugang Wang and Tatsuaki Hishida now U.S. Pat. No. 5,978,319 which is incorporated herein by reference.

BACKGROUND OF THE INVENTION

1. Field of the Invention

This invention relates generally to optical and magneto-optical data storage systems, and in particular to a slider and a thin film electromagnetic coil assembly for use in optical and magneto-optical data storage systems. The coil assembly may be used in other applications, including but not limited to wireless telecommunications, sensors, transducers, transformers, and inductors.

2. Description of Related Art

A conventional magnetic storage system includes a magnetic head that has a slider and a magnetic read/write element, and is coupled to a rotary actuator magnet and a voice coil assembly by a suspension and an actuator arm to be positioned over a surface of a spinning magnetic disk. In operation, lift forces are generated by aerodynamic interactions between the magnetic head and the spinning magnetic disk. The lift forces are opposed by equal and opposite spring forces applied by the suspension such that a predetermined flying height is maintained over a full radial stroke of the rotary actuator assembly above the surface of the spinning magnetic disk.

Flying head designs have been proposed for use with optical and magneto-optical (MO) storage technology. One motivation for using the magneto-optical technology stems from the availability of a higher areal density with magneto-optical storage disks than magnetic storage disks. However, despite the historically higher areal storage density available for use with magneto-optical disks drives, the prior art magneto-optical disk drive volumetric storage capacity has generally not kept pace with the volumetric storage capacity of magnetic disk drives.

One factor that limits MO disk drives is the magnetic coil that generates the necessary magnetic field for writing data on the MO disk. The magnetic field is applied to a spot of interest on the MO disk from the direction of the incident laser beam, or from the opposite direction. However, some of the magnetic coils used in these commercial magneto-optical heads are relatively large and heavy devices with bulky hand wound coils. These large magnetic coils generally have high inductance and low resonance frequencies leading to background noise problems at higher data transfer rates.

The following patents provide examples of electromagnetic coil designs for use in various applications, including data storage systems:

U.S. Pat. No. 4,890,178 to Ichibara;
U.S. Pat. No. 5,022,018 to Vogelgesang et al;
U.S. Pat. No. 5,072,324 to Lin et al.;
U.S. Pat. No. 5,105,408 to Lee et al.;
U.S. Pat. No. 5,124,961 to Yamaguchi et al.;
U.S. Pat. No. 5,197,050 to Murakami et al.;
U.S. Pat. No. 5,295,122 to Murakami et al.;
U.S. Pat. No. 5,307,328 to Jacobs et al.; and
U.S. Pat. No. 5,331,496 to Wu et al.;
U.S. Pat. No. 5,370,766 to Desaigoudar et al.;
U.S. Pat. No. 5,544,131 to Albertini et al.;
U.S. Pat. No. 5,563,871 to Bargerhuff et al.;
U.S. Pat. No. 5,572,179 to Ito et al.;
U.S. Pat. No. 5,615,183 to Ishii; and
U.S. Pat. No. 5,642,336 to Albertini et al.

What is needed is small, a low mass electromagnetic coil assembly and a slider for carrying the coil assembly, wherein the coil assembly is capable of generating a vertical magnetic field intensity greater than 200 Oersteds over a large area, and is further capable of transducing high data transfer rates from and to an optical or a MO data storage system.

SUMMARY OF THE INVENTION

One aspect of the present invention is to provide an electromagnetic coil assembly for attachment to a slider in an optical or magneto-optical data storage system. The coil assembly has compact, low mass, and high field characteristics, and generates a large magnetic field intensity in the vertical direction, over a large area of the data storage disk (i.e., approximately 200 $\mu$m by 200 $\mu$m).

Another aspect of the coil assembly resides in its relatively inexpensive mass production and assembly cost. The manufacturing process of the coil assembly is compatible with proven wafer processing techniques, and provides highly efficient throughput for mass production.

The coil assembly has a low inductance, thus increasing the resonance frequency of the head and improving its data recording rates. The small size and low mass of the coil assembly further improves the head data access rates.

The coil assembly includes an undercoat, and an electrically conductive coil formed of a length of electrical conductor and deposited and secured to the undercoat by means of available wafer processing techniques. The conductive coil terminates in two bonding pads for providing electrical connection to the coil, such that the coil is capable of sustaining an electrical current in excess of approximately 300 mA. The coil is also capable of generating a significant magnetic field intensity in the vertical direction, and has a resistance of less than approximately 2 ohms.

The coil assembly further includes a yoke, and an insulation layer which encapsulates at least part of the conductor. The conductor is formed of a plurality of multi-layered turns, such that a first layer is connected to one contact pad and is looped helically, inwardly, and terminates in an innermost terminal end. A second layer includes an innermost terminal end that overlays the innermost terminal end of the first layer, in order to establish an electrical contact therewith, and to ensure the continuity of the electrical path formed by the coil. The second layer is coiled into a plurality of concentric helical turns, similar to, and in a same coiling direction as the first layer. The conductor is made of an electrically conductive material and has a substantially uniform square cross-sectional area along its entire length.

The yoke is formed of three sections: a base section, an intermediate section, and a central section, wherein the central section of the yoke fits within a central region of the coil and does not include holes. The undercoat may include a detachable tab that facilitates the handling of the coil assembly during manufacture and assembly.

In one embodiment the coil assembly is affixed to a slider on a rotary actuated access mechanism similar to a Winchester disk drive or on a linear actuated access mechanism. The coil assembly generates a vertical magnetic field intensity greater than 200 Oersteds over a relatively large area, for example 200 microns×200 microns. The coil assembly preferably includes a two layered coiled conductor (or coil) housed partly within the yoke, and encapsulated within an overcoat insulation layer. However, in other embodiments the coiled conductor may comprise one or multiple conductor layers. The coil assembly can accommodate a relatively high current (such as approximately 300 mA) to flow therethrough. The dimensions of the coil can vary over a wide range, with the systemic parametric requirements, as needed, while still maintaining a relatively low mass compact structure.

The foregoing and further features of the present invention are realized by a slider that supports or stores a device such as an electromagnetic coil assembly or an electronic component, and includes an underside formed of a taper, a flat air bearing surface, and a recessed region. The recessed region receives the device without significantly affecting the aerodynamic performance of the air bearing surface, and is located at the slider trailing edge. In certain applications the device underside is recessed relative to the air bearing surface, while in other application the device underside is flush relative to the air bearing surface. The device includes an electrical conductor that extends along the recessed region.

According to another embodiment, the slider includes a vertical channel located in a front side of the slider that extends along the entire slider depth. The vertical channel accommodates the electrical conductor of the device. One or more horizontal channels may optionally be formed in the slider front side, at an angle relative to the vertical channel, such that at least one of these horizontal channels is connected to the vertical channel.

According to yet another embodiment, the slider is modularly formed, and has an upper section, a lower section secured to the upper section, wherein the upper slider section includes a taper at a leading edge, and a flat air bearing surface. A recessed region is by a trailing edge of the upper slider section and a top surface of the lower slider section. While the air bearing surface is described as being preferably flat. it should be clear that the air bearing surface can be patterned with positive or negative pressure generating surfaces.

BRIEF DESCRIPTION OF THE DRAWINGS

The features of the present invention and the manner of attaining them, will become apparent, and the invention itself will be understood by reference to the following description and the accompanying drawings, wherein.

Similar numerals refer to similar elements in the drawings. It should be understood that the sizes of the different components in the figures may not be in exact proportion, and are shown for visual clarity and for the purpose of explanation.

DETAILED DESCRIPTION OF THE INVENTION

Figure 1:
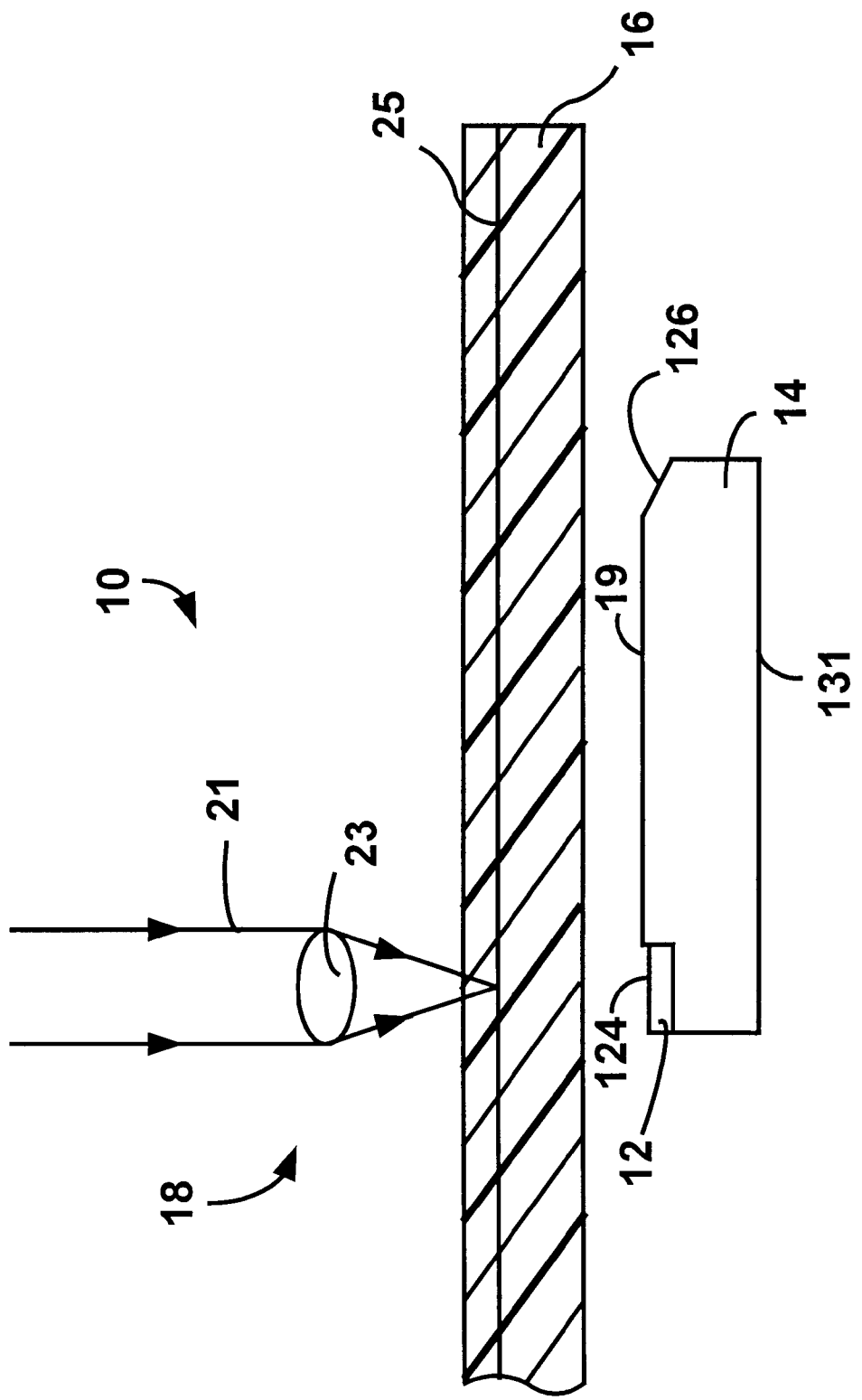
FIG. 1 is a fragmentary, partly sectional, side elevational view of a magneto-optical data storage system showing an electromagnetic coil assembly of the present invention mounted on a slider and disposed on the opposite side of a disk relative to an optical assembly.

FIG. 1 illustrates a magneto-optical data storage system 10 including an electromagnetic coil assembly 12 made and mounted on a slider 14, pursuant to the teaching of the present invention. The magnetic coil assembly 12 is disposed at a distance from an optical or magneto-optical (MO) data storage medium or disk 16. An optical assembly 18 is positioned at a distance from the disk 16. As used herein, the term "coil assembly" 12 may also be referred to as, complemented, or replaced with a "transducer".

The slider 14 forms part of a head gimbal assembly, and is also referred to herein as a support element since it supports the coil assembly 12. The coil assembly 12 is secured to an underside 19 of the slider 14. The underside 19 is the surface of the slider 14 facing the disk 16. While the coil assembly 12 is shown as being substantially secured to an edge of the slider 14 for illustration purpose, it should be clear that the coil assembly 12 can be secured at any suitable position on, or at least partly within the slider 14, as long as the coil assembly 12 generates the required magnetic field.

In operation, a light beam, such as a laser beam 21 impinges upon, and is focused by a lens 23 onto a MO layer 25 of the disk 16. The coil assembly 12 generates a vertical magnetic field with a large magnetic field intensity Hz (FIG. 4) in the vertical direction, for example greater than 200 Oersteds, over a large area of the disk 16, for example 200 microns by 200 microns, to enable the transduction of data relative to the MO layer 25.

The details of the coil assembly 12 will now be described with reference to FIGS. 2 through 6. The coil assembly 12 is comprised of an electrically conductive coil 30 formed of a length of electrical conductor 32, and is either deposited or formed on a film or undercoat layer 34 by means of thin-film wafer processing techniques. The undercoat layer 34 is formed of a dielectric film preferably made of alumina. It should however be clear that other suitable flexible materials (such as a flex circuit or film) or rigid dielectric materials (such as silicon) may alternatively be used. The undercoat layer 34 is light weight and durable, and facilitates the assembly of the coil assembly 12 onto the slider 14. The thickness of the undercoat layer 34 is approximately 4 to 12 microns, though other dimensions may optionally be selected. The undercoat layer 34 may also be referred to as a surface attachment layer, base layer, or substrate.

The coil assembly 12 has compact, low mass, and high field characteristics. The size compactness of the coil assembly 12 allows for a more efficient design especially at higher frequencies since the inductance decreases as the transducer size decreases. This lower inductance raises the resonating frequency of the coil assembly 12, which increases the data recording rate.

The overall mass of the coil assembly 12 can range between approximately 0.03 grams and 0.05 grams. The overall dimensions of the coil assembly 12 can be significantly smaller than the slider underside 19. In addition, as it will be described later, the coil assembly 12 can be positioned in a recessed region 39 (FIG. 4) of the slider underside 19 which is not an effective air bearing surface, that is a region which does not significantly affect the air flow acting on the slider underside 19. As a result, the flying height of the slider 14 is not significantly affected by the presence of the coil assembly 12, thus ensuring a precise control of the flying height of the slider 14 above the disk 16. In addition, the minimal thickness of the coil assembly 12 minimizes the overall z-height (e.g. the vertical height or inter-disk spacing) of a head stack assembly (not shown), thereby enabling a disk drive to accommodate an optimal number of disks 14 in a predetermined space. It should be clear that the specific quantities or ranges stated herein are for reference only and that other values may be used depending on the systemic design specifications.

The coil assembly 12 further includes two bonding (or contact) pads 35, 36 that provide electrical connection to the coil 30. The bonding pads 35, 36 may be made of electroplated soft gold typically used in ultrasonic wire bonding applications. The coil 30 is further secured to the undercoat layer 34 by means of three holding (or bonding) pads 41, 42, 43, optionally forming part of a yoke 55 (FIGS. 3 and 5), for ensuring a firm connection of the coil 30 to the undercoat layer 34. It should be clear to a person of ordinary skill in the field that a different number of pads may alternatively be used. The holding pads 35, 36 are formed on the undercoat layer 34 using thin-film deposition techniques, and are connected to the terminals of the coil 30.

In one embodiment, the coil assembly 12 also includes one or more, preferably two, generally identical, distally located tooling, alignment and handling holes (not shown) formed in the undercoat layer 34, one hole on each side of the coil 30. The holes facilitate the handling, alignment, and bonding of the coil assembly 12 onto the slider 14.

Figure 2:
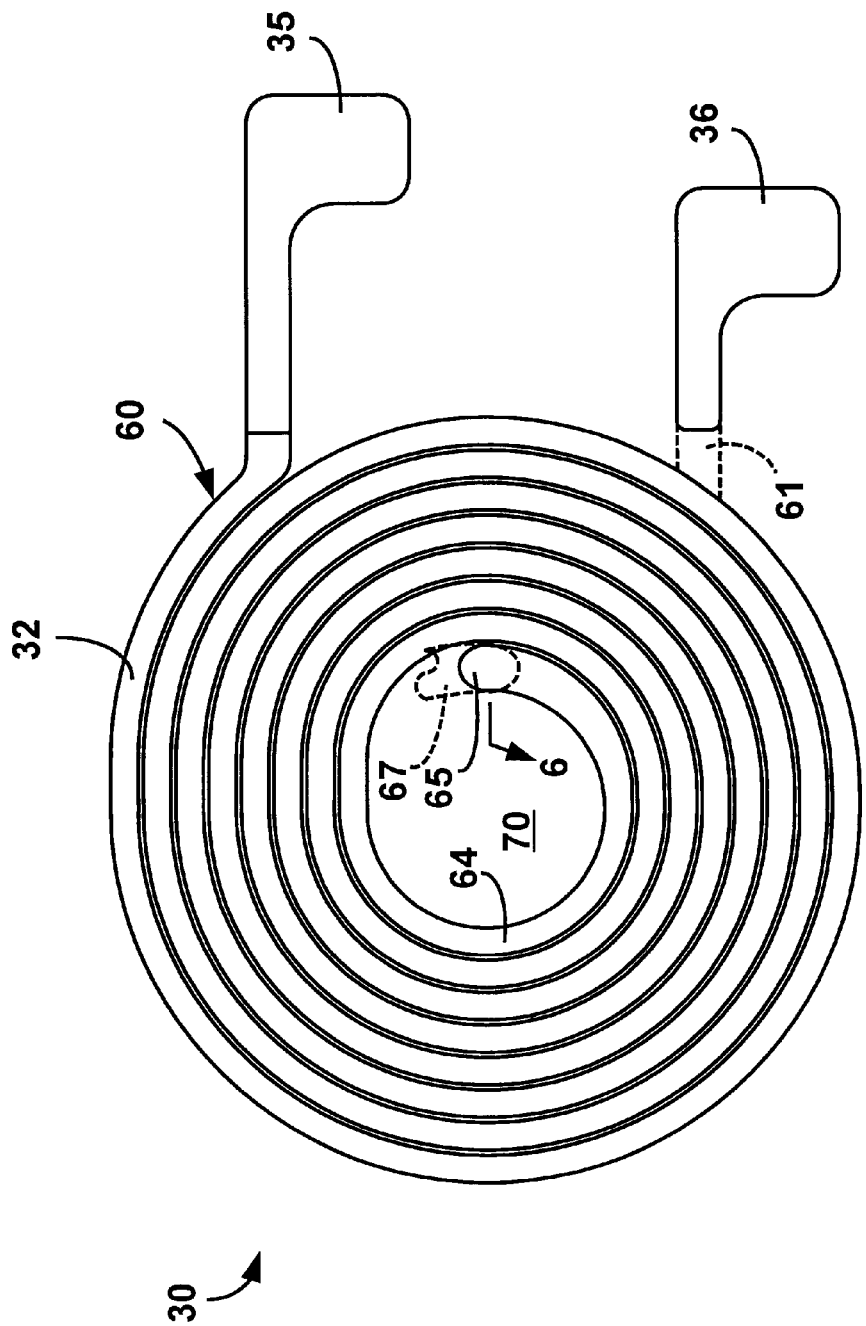
FIG. 2 is an enlarged bottom plan view of a coil used in the coil assembly of FIG. 1, showing a bottom or first layer and two contact pads.

The conductor 32 is coiled, covered by the yoke 55, and encapsulated within the insulation layer 56. The conductor 32 includes a plurality of multi-layered turns 57 (FIGS. 4, 5), for example 6 to 40 turns, with only two layers 60, 61 being shown. The first or bottom layer 60 is connected to the contact pad 35, extends through the yoke 55, and is looped helically, inwardly, and terminates in an innermost turn 64 with a terminal end 65 (FIGS. 2 and 6). The second or upper layer (61) starts with a terminal end 67 of an innermost turn 68 (FIGS. 2, 4 and 6). The innermost terminal end 67 of the second layer 61 overlays the innermost end 65 of the first layer 60 in order to establish an electrical contact therewith, and to ensure the continuity of the electrical path formed by the coil 30. The second layer 61 is then coiled into a plurality of concentric helical turns 57, similar to, and in the same coiling direction as the first layer 60, extends through the yoke 55, and terminates in the contact pad 36. The innermost turn 64 of the first layer 60 defines a central region 70 (FIGS. 2, 3, 4) which is generally circular or helical in shape. In a preferred embodiment, the coil 32 has a generally circular or elliptical shape; however, other shapes may alternatively be selected.

The conductor 32 is made of a suitable electrically conductive material such as copper. While the conductor 32 is illustrated as having a substantially uniform square cross section along its entire length, it should be understood that other appropriate shapes may be selected. The cross-sectional area of each turn 57 varies between approximately 8 microns and approximately 30 microns, and preferably between approximately 8 microns and approximately 16 microns.

The turns 57 are encapsulated within the protective insulation layer 56, and are interspaced and separated by a distance varying between approximately 2 microns and approximately 12 microns, and preferably between approximately 2 microns and approximately 8 microns. The insulation layer 56 is made of a suitable dielectric material, such as photoresist material.

The yoke 55 is made of a suitable ferromagnetic high permeability material such as 81Ni:19Fe nickel iron alloy. A distinctive feature of the coil 30 is that the yoke 55 is formed on top of the insulation layer 56 and the conductor 32, and extends within the central region 70, so as to constitute a continuous integral layer that covers the top portion of the insulation layer 56.

Figure 4:
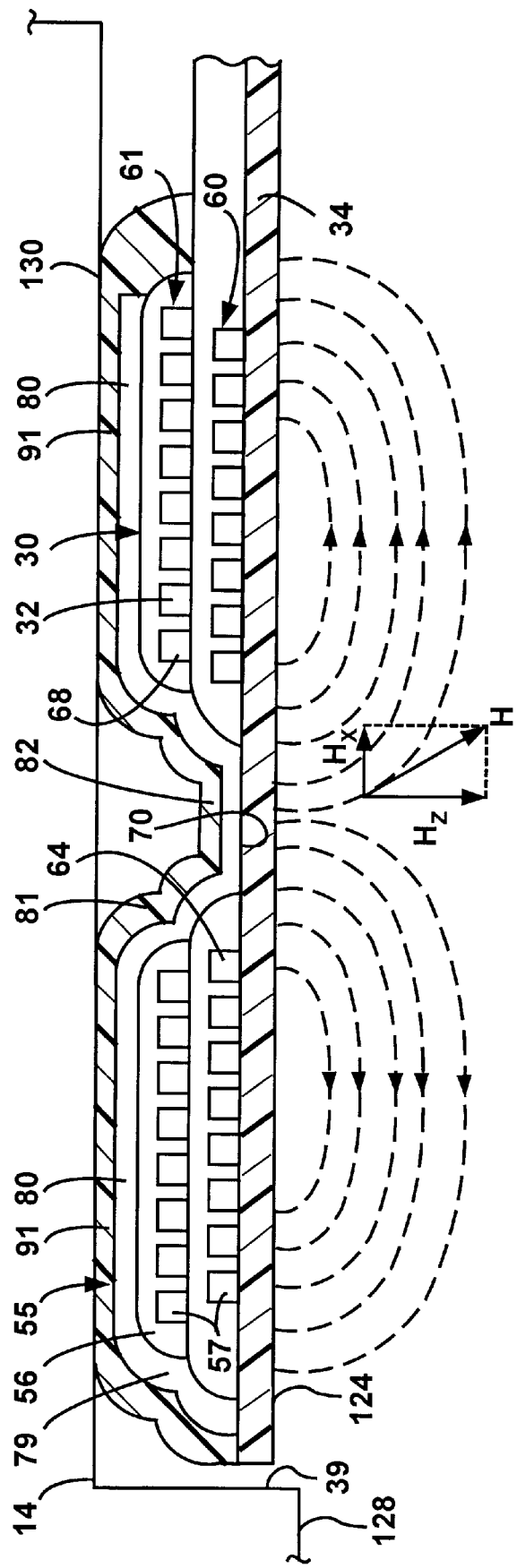
FIG. 4 is a greatly enlarged, cross-sectional, side elevational view of the coil mounted on the slider and taken along line 4—4 of FIG. 3, and further illustrating a magnetic field generated by the coil, the yoke, and an insulation layer separating the two coil layers, but not showing an overcoat protective layer.
Figure 5:
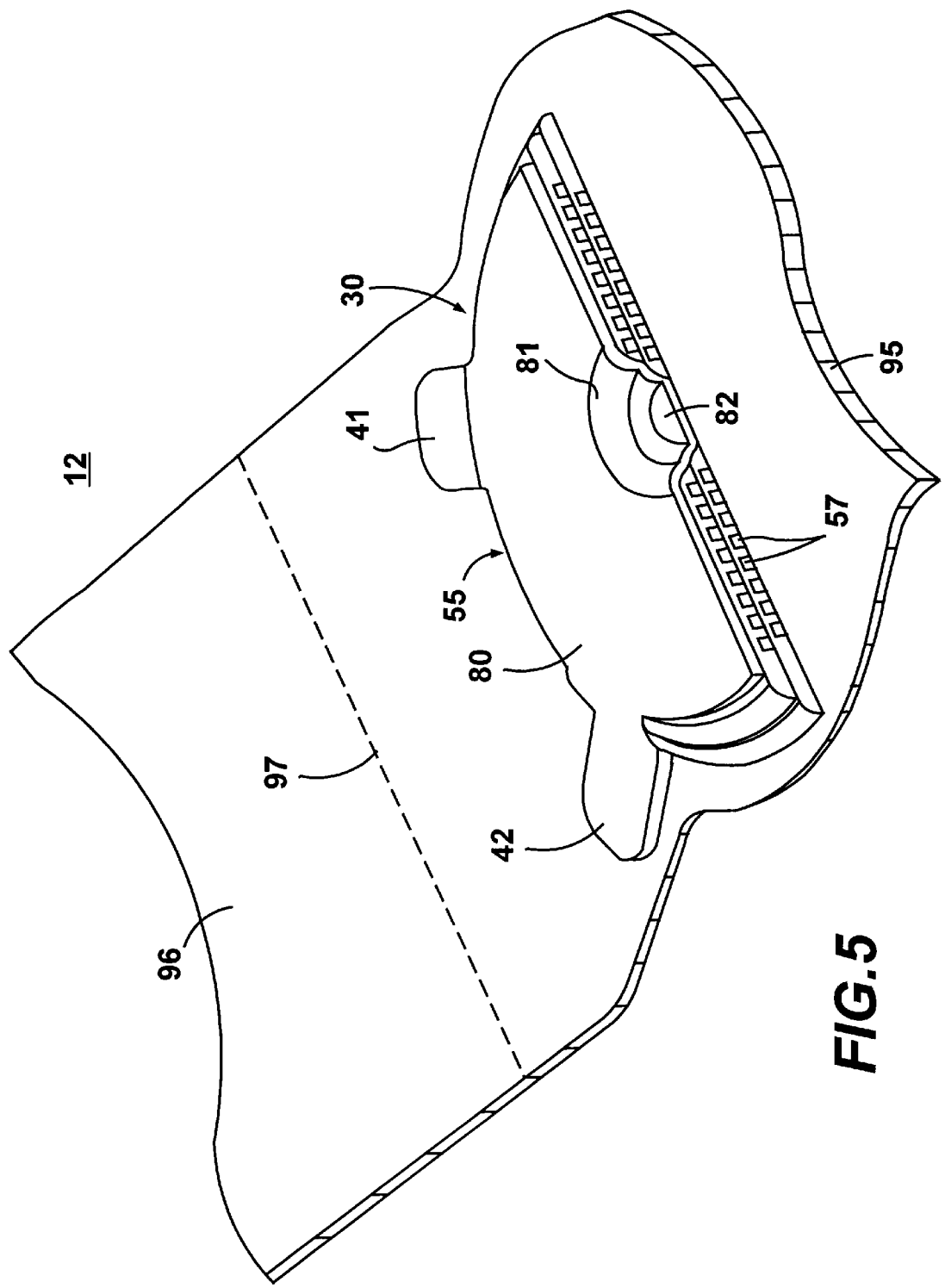
FIG. 5 is a perspective, partly cross-sectional view of the coil of FIGS. 1 through 4 shown formed on, or bonded to an undercoat layer (or support member) having a different shape than that of FIG. 3.
Figure 6:
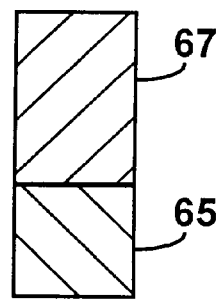
FIG. 6 is a partly cross-sectional view of a coiled conductor forming part of the coil taken along line 6 of FIG. 3, and showing a terminal end of one conductor layer overlaying a terminal end of another conductor layer.

With reference to FIGS. 4 and 5, the yoke 55 is formed of four integral (or continuous) sections that are made using available thin film wafer technology: an outer section 79, a base section 80, a sloping (or intermediate) section 81, and a central section 82. In one embodiment, the outer section 79 covers the outer periphery of the coil 30 and extends to, or toward the undercoat layer 34. In another embodiment the outer section 79 is formed of the bonding pads 41, 42, 43 that extend along the side of the coil 30 and terminate on the undercoat layer 34.

The base section 80 is generally flat and disk shaped, and is formed on the insulation layer 56, on top of the uppermost layer 61 (in this example the second layer). The base section 80 extends integrally or continuously into the sloping section 81 that covers an inner side of the insulation layer 56.

In turn, the sloping section 81 extends continuously into the central section 82 that fits within the central region 70 defined by the conductor 32. The central section 82 is substantially flat and, in a preferred embodiment, does not include a hole that allows a light beam to pass through for writing or recording data on the disk 16. It should however be clear that other design modifications of the yoke 55 are possible without affecting the substance of the present invention. The central section 82 is generally circularly (or elliptically) shaped with a diameter ranging from approximately 90 microns to approximately 150 microns.

The yoke 55 extends in proximity to the MO layer 25 of the disk 16 (FIG. 1), for increasing the magnetic field at the MO layer 25. As is shown in FIG. 4, the magnetic field intensity includes a vertical component Hz and a horizontal component Hx. While the horizontal component Hx or the combination of the vertical and horizontal components Hz and Hx may be used in various applications to replace transducers, coils, inductors, or transformers, the present example, i.e., a data storage system illustrated in FIG. 1, mainly uses the vertical component Hz for recording onto vertical domains in the MO layer 25. The vertical component Hz ranges between approximately 200 Oe and approximately 300 Oe over an area of approximately 200 microns by 200 microns of the MO layer 25.

The thickness of the yoke 55 is preferably uniform and may range between approximately 5 $\mu$m and approximately 10 microns. In another embodiment, the thickness of the yoke 55 is not uniform, and any one or more of the sections 80, 81, 82 forming the yoke 55 may have a different thickness than the remaining section or sections. In the embodiment shown in FIG. 4 the thickness of the central section 82 of the yoke 55 is approximately equal to the height of the first layer 60. It should be clear that the dimensions mentioned herein are simply for purposes of illustration and that other values may be used instead.

Figure 7:
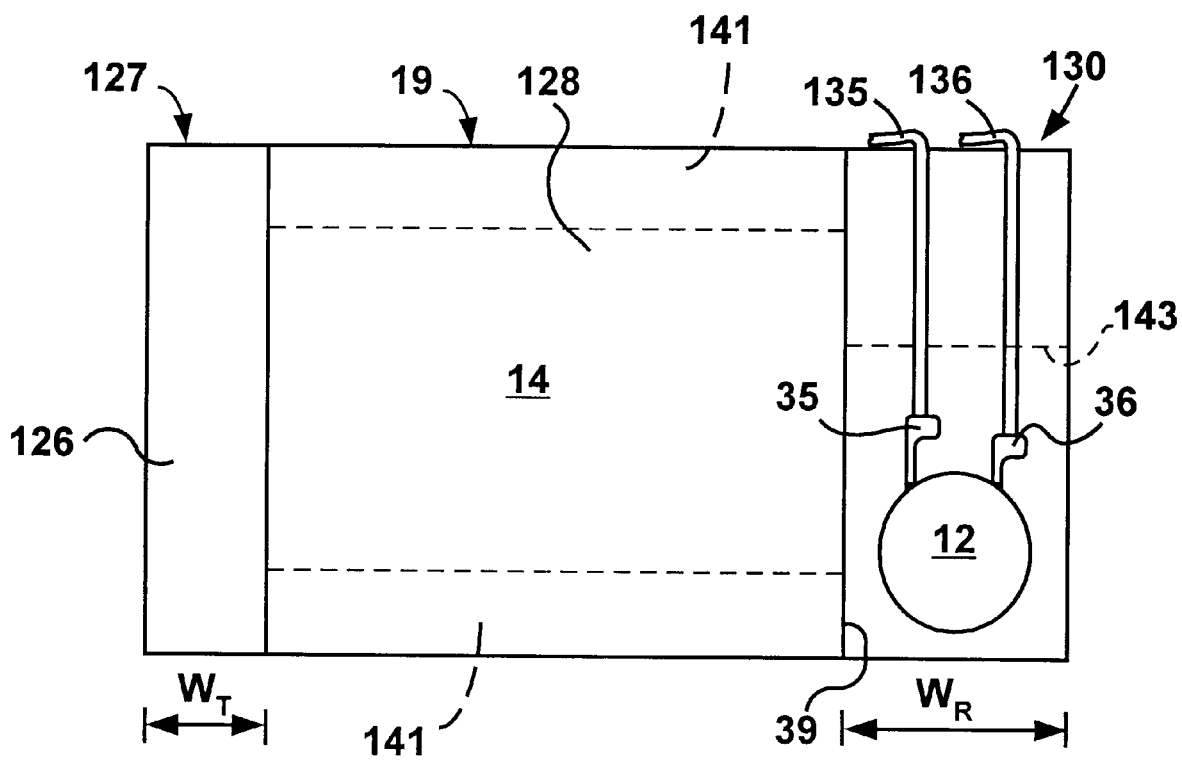
FIG. 7 is a bottom plan view of the coil assembly of FIG. 1, shown mounted on a slider made in accordance with a first embodiment of the present invention.

With reference to FIGS. 4 and 7, the coil 30 is at least partly encapsulated within the overcoat layer 91 for added protection and insulation. The overcoat layer 91 is secured or bonded to the slider 14.

Figure 3:
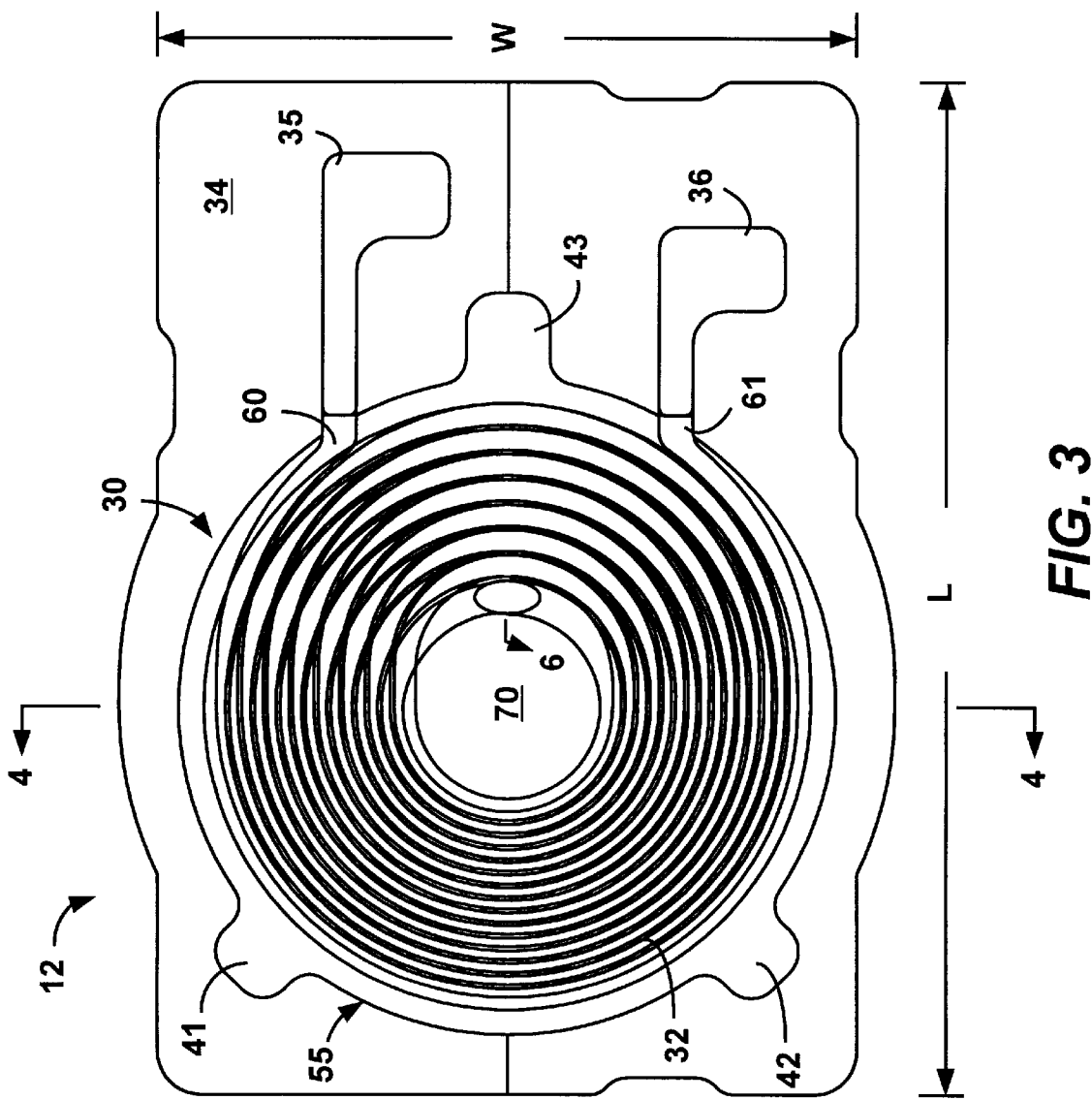
FIG. 3 is an enlarged bottom plan view of the coil assembly of FIG. 2, showing a twolayer coil formed on an undercoat layer, but not illustrating an insulation layer separating the two coil layers.

With reference to FIG. 5, the coil assembly 12 includes an undercoat 95 having a different shape than the undercoat layer 34 of FIG. 3, to illustrate potential design variations. In addition, the undercoat 95 (or 34) may include a tab 96 that facilitates the handling of the coil assembly 12 during manufacture and assembly. The tab 96 is preferably detachable and may eventually be broken away along a line 97, when the coil assembly 12 is secured to the slider 14. The tab 96 may be made of any suitable rigid or semi-rigid material, or may be made as part of the undercoat layer 95.

The coil assembly 12 is manufactured on a wafer substrate or any suitable substrate (not shown) by depositing a continuous base film of copper using available electroplating or evaporation techniques. A continuous film of alumina, which eventually yields the undercoat layer 34, is deposited on the base film and the coil 30 is then formed on the copper base film.

Other materials or alloys tailored for thermal expansion matching to the wafer substrate and/or the undercoat layer 34 may be used. This is useful in controlling the internal stress of the resulting coil assembly 12 either to maintain flatness or to induce a degree of desired bending. It should be noted that this continuous copper base layer is selectively soluble in an etching solution that does not attack the alumina undercoat layer 34.

The coil 30 is formed on the undercoat layer 34 using available thin film processing techniques which include: (1) sputter deposition of an adhesive/conductive plating base layer such as Titanium 250/Copper 500; (2) photo resist coating and imaging to form a plating mold; (3) electroplating with copper to form the coil 30; (4) removing the photoresist; and (5) removing the thin plating base layer using ion milling.

The coil 30 is protected by applying a photoresist insulation layer 56 (FIG. 4). The coil forming process may be repeated at this point to add multiple coil layers if desired. The insulated coil 30 is then patterned and electroplated with NiFe 81:19 Permalloy to form the yoke 55 using similar thin film processing techniques as described for the coil 30, except that a NiFe 1000 conductive plating base layer is used.

A protective overcoat alumina layer 91 (FIG. 4) is then deposited on the inductor 32 and yoke 55 for protection, and is selectively removed over the coil terminals so that they may be deposited with gold to provide accessible electrical connection to the coil 30. The coil 30, the yoke 55, and the overcoat 91 are then masked with photoresist to produce an island delineating the final shape of the undercoat layer 34, and excess alumina is etched away for exposing the copper base layer underneath. The copper base layer is then etched away from around and underneath the islands. When the copper base layer is completely dissolved, the individual islands defining the coil assemblies are released from the copper base layer, as described in U.S. Pat. No. 5,174,012 to Hamilton, which is incorporated herein by reference.

Although the undercoat layer 34 is illustrated as being substantially flat, it should be clear that other shapes and configurations are possible. The following exemplary dimensions for the coil assembly 12 are included for illustration purpose and are not intended to limit the present invention. With reference to FIG. 3, the length "L" of the undercoat layer 34 is approximately 1220 microns. The width "W" of the undercoat layer 34 is approximately 940 microns.

The design objectives of the exemplary coil 30 described here are to meet or exceed the following requirements, though other design objectives may be set:

Coil current: exceeds approximately 300 mA.
Vertical magnetic field intensity: greater than, or equal to approximately 200 Oersteds.
Coil self-inductance: less than approximately 170 nH.
Capacitance: less than approximately 5 pF.
Resistance: less than approximately 2 $\Omega$.
With reference to FIGS. 1, 4 and 7, the coil 30 (more specifically the yoke 55 and/or the undercoat layer 34) is surface mounted to, or bonded on the underside 19 of the slider 14 by means of available techniques, such as an adhesive. In one embodiment the underside 19 includes a taper 126 at the slider leading edge 127, a flat (or alternatively patterned) air bearing surface 128, and the recessed region 39 at the slider trailing edge 130.

The taper 126 enables a lift force to be generated at the slider leading edge 127, and is preferably inclined at an angle of approximately 40 degrees relative to the flat air bearing surface 128. It should be understood that other values of the inclination angle may be selected. The air bearing surface 128 controls the flying height of the slider 14. When a particular application requires a relatively high flying height, the air bearing surface is made flat and is not provided with side rails. Side rails 141 (illustrated in dashed lines in FIG. 7) may optionally be added to control the slider flying height. The flying height varies, for example, between approximately 0.5 $\mu$m and approximately 1 $\mu$m.

The recessed region 39 is formed along the entire width of the slider trailing edge 130 to facilitate the manufacture process of the slider 14. However, as shown by the dashed line 143 (FIG. 7), the recessed region 39 may extend to a desired distance along the width of the slider trailing edge 130. Though preferably the recessed region 39 plays a minimal role as an air bearing surface, it should be understood that, in light of the present disclosure, it is foreseeable to vary to depth of the recessed region 39 so that it affects the air bearing surface to a desired extent.

In a preferred embodiment, the underside 124 (FIGS. 1, 4, 11) of the coil assembly 12 is recessed relative to the air bearing surface 128. In another embodiment the underside 124 is coplanar (i.e., flush) with the air bearing surface 128.

The slider 14 has the general dimensions of a mini-slider, that is a length of 0.160 inch (4064 $\mu$m), a width of 0.125 inch (3175 $\mu$m), and a height of 0.035 inch (889 $\mu$m), in accordance with the International Disk Drive Equipment and Material Association (IDEMA) specifications. It should however be clear that other slider dimensions may be used. The slider 14 includes a substantially flat, rectangularly shaped overside 131, and four upright flat sides.

With reference to FIG. 7, the width $W_T$ of the taper 126 is approximately 15 mils. The width $W_R$ of the recessed region 39 is approximately 39 mils. The depth of the recessed region 39 is approximately 3.5 mils.

The slider 14 may made of any suitable material such as ($Al_2O_3$:TiC). A pair of conductors 135,136 are connected to the bonding pads 35, 36, respectively and extend within the recessed region 39 along the slider trailing edge 130.

Figure 8:
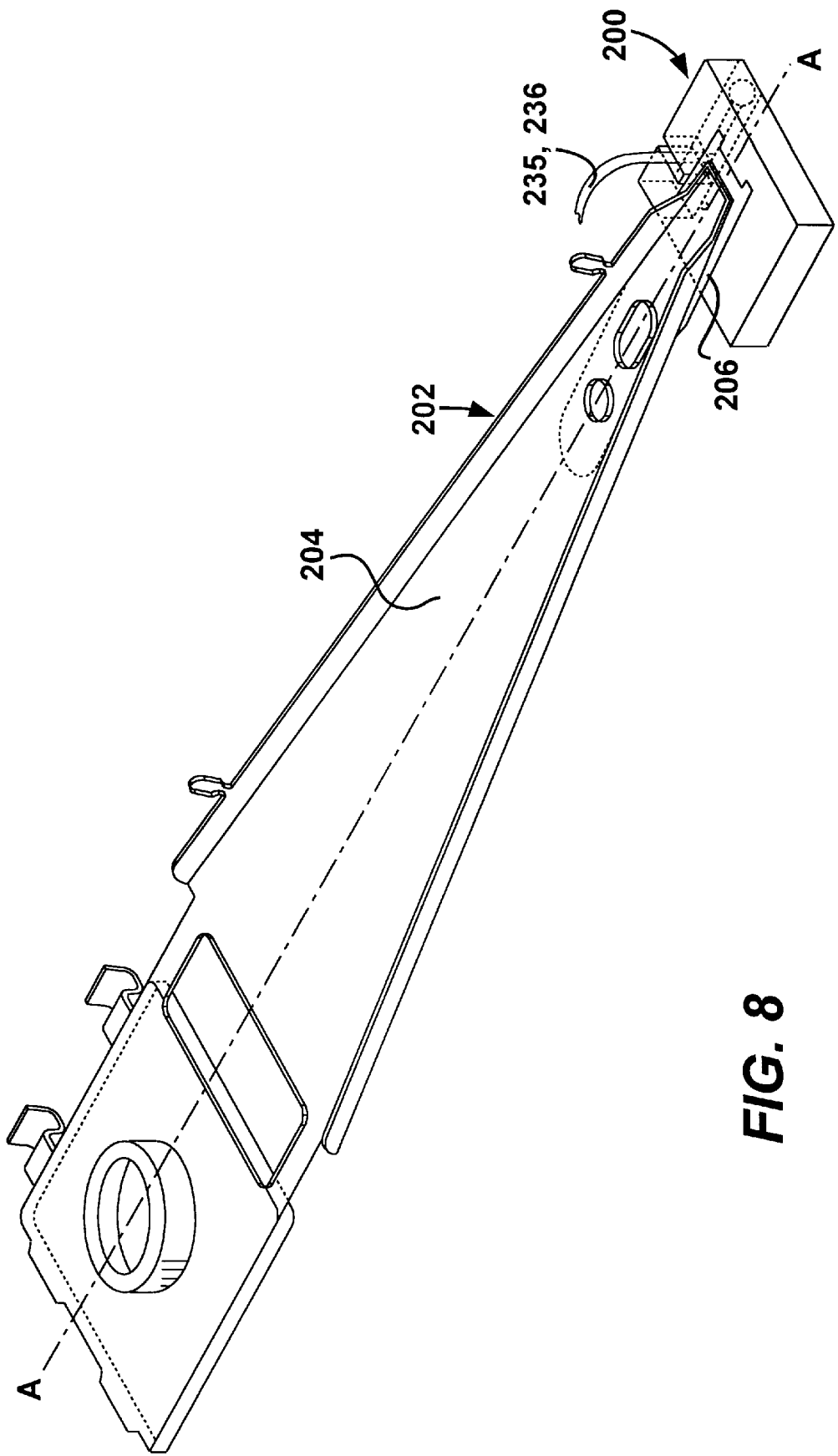
FIG. 8 is a perspective view of another slider embodiment according to the present invention viewed from above, and the coil assembly of FIGS. 1–7, shown secured to a suspension for use in a head gimbal assembly and ultimately in a head stack assembly.
Figure 9:
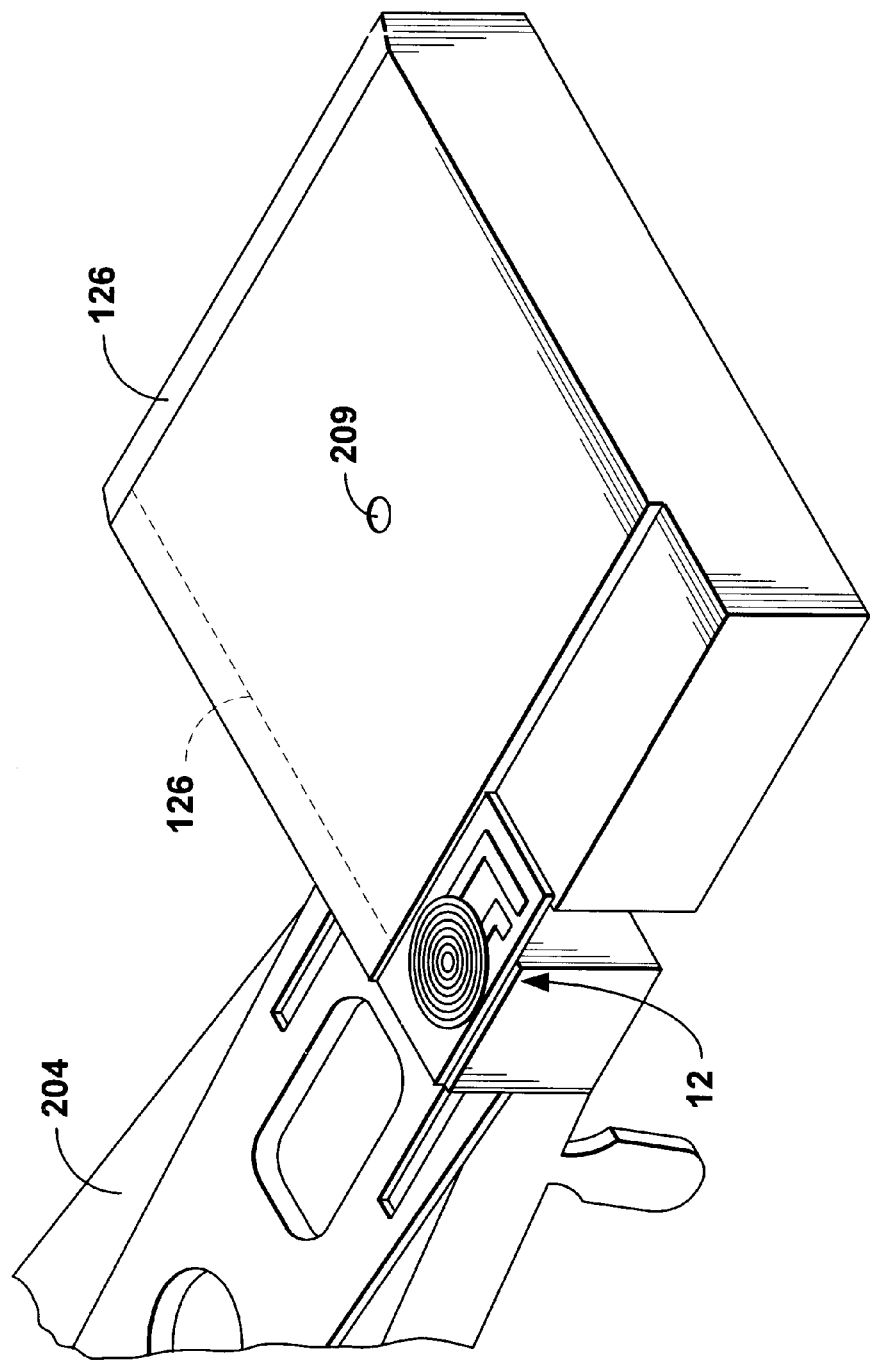
FIG. 9 is an enlarged perspective view of the slider and coil assembly of FIG. 8, viewed from below, and shown oriented in a lateral position relative to the suspension.

FIGS. 8, 9, and 11 through 13 illustrate a slider 200 according to another embodiment of the present invention. FIG. 8 shows the slider 200 secured to a suspension 202 formed of a load beam 204 and a flexure 206. In the embodiment where a maximum flying height is desired, a relatively low gram load is applied to load beam 204, so as to produce a gram load ranging between approximately 0 and 0.5 gram at approximately the geometric center 209 (FIG. 9) of the slider 200. However, the gram load applied to the suspension 202 may vary with the desired application.

Figure 10:
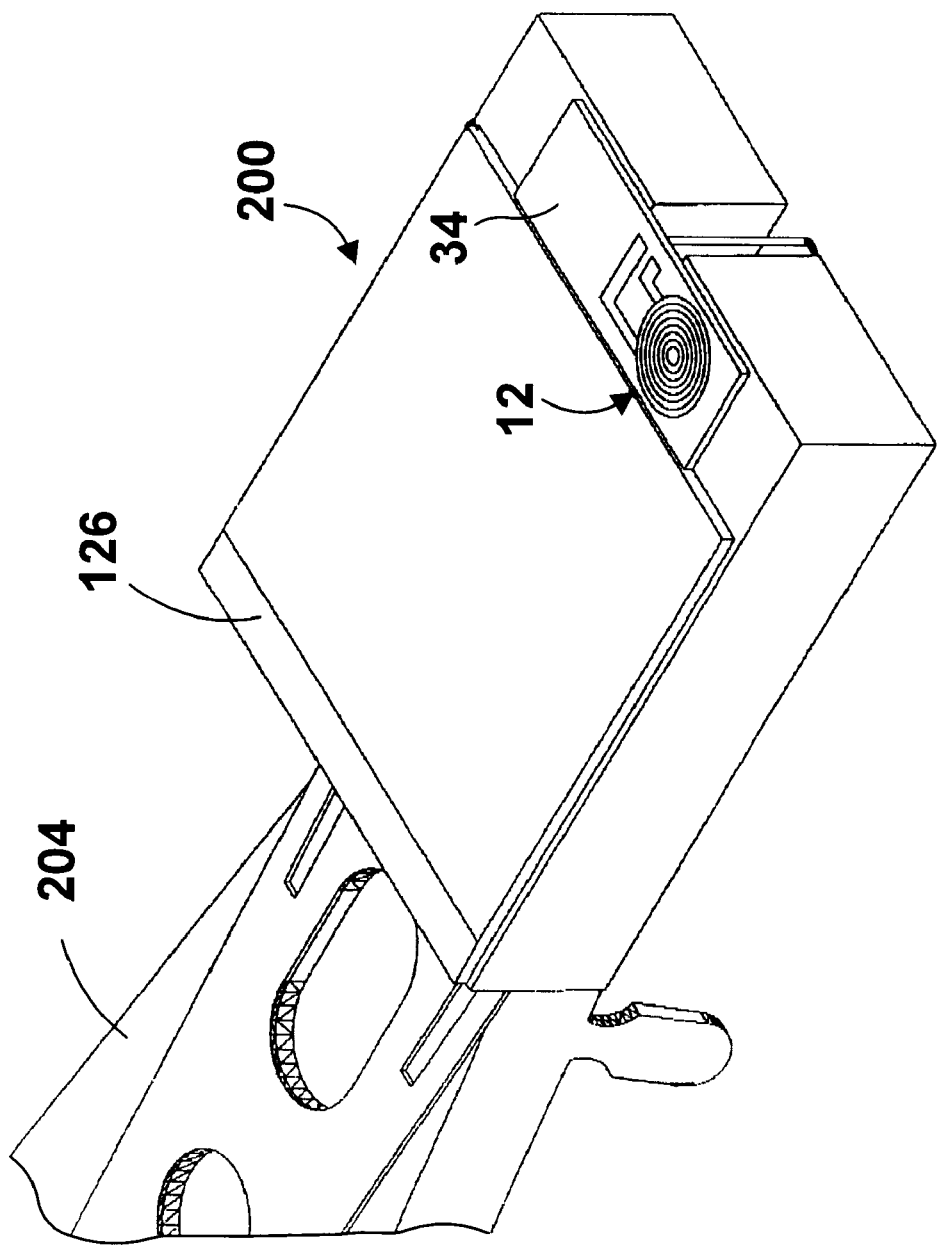
FIG. 10 is a greatly enlarged perspective view of a slider and coil assembly that are similar to the slider and coil assembly of FIG. 8, with the slider shown oriented in an axial position relative to the suspension.
Figure 11:
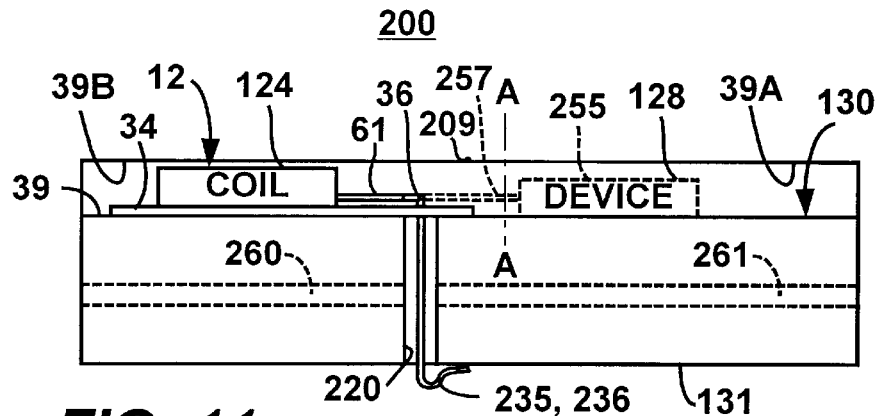
FIG. 11 is a front elevational view of the slider and coil assembly of FIG. 10.
Figure 12:
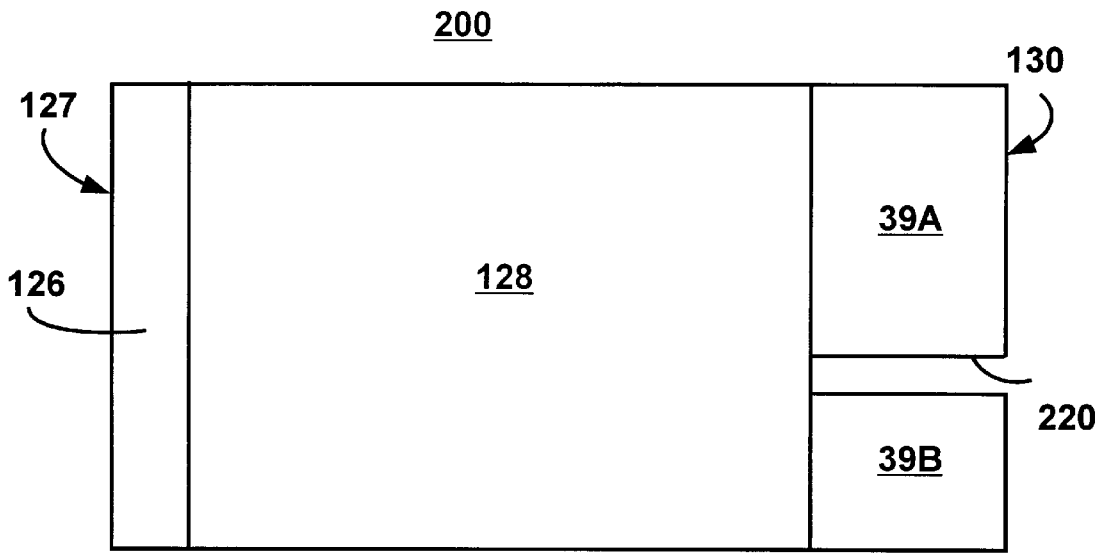
FIG. 12 is a top plan elevational view of the slider and coil assembly of FIG. 10.
Figure 13:
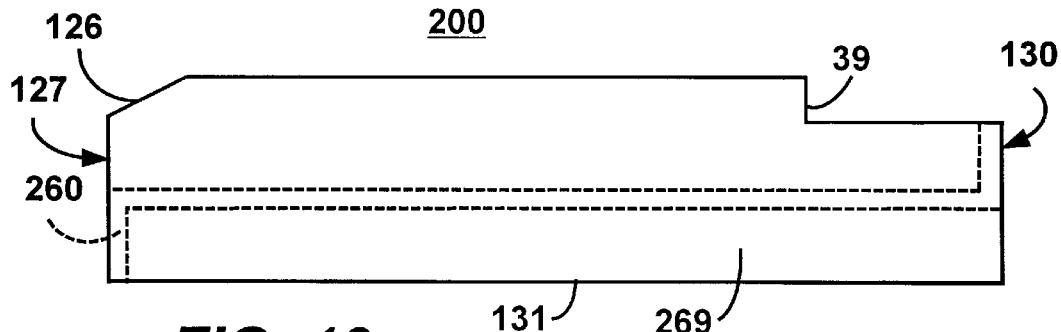
FIG. 13 is a side elevational view of the slider and coil assembly of FIG. 10.

FIG. 11 illustrates the offsetting of the slider 200 relative to a central longitudinal axis A—A of the load beam 204 (FIG. 8), in order to balance the lift force on the slider 200. The offset distance is approximately 20 mils, but may vary between approximately 4 mils and approximately 40 mils. In some designs, such as where the slider is oriented longitudinally (or radially), as illustrated in FIG. 10, it may not be necessary to offset the slider 200 relative to the suspension 202.

The slider 200 is generally similar to the slider 14, and further includes at least one vertical channel (or first channel) 220 formed within the trailing edge 130 of the slider 200. As used herein, the terms indicating direction or orientation, such as "vertical", "horizontal", "top", "bottom", "upper", and "lower" are relative to the sliders. It should be understood that the frame of reference is not necessarily to the ordinary gravitational frame of reference. The channel 220 extends throughout the entire depth of the recessed region 39. Conductors 235, 236 are secured to the bonding pads 35, 36, respectively, and extend through the undercoat 34 and the channel 220, and along one side of the load beam 204. The channel 220 is sufficiently wide commensurate with the dimensions of the conductors 235, 236. For example, the width of the channel 220 varies between approximately 15 mils and approximately 60 mils. While various channels described herein are referred to as "vertical" or "horizontal" channels, it should be clear that the terms "vertical" and "horizontal" are intended to refer to a general angular disposition of the channels, rather than a specific orientation or angular disposition.

The channel 220 divides the recessed region 39 into two sub-regions 39A and 39B. The coil assembly 12 is secured to one of these sub-regions, for instance 39B. Since, as described above the recessed region 39 does not significantly affect the air flow acting on the slider 200, it can be used as a "storage" area where a device 255 (shown in dashed lines) such as another coil assembly 12, an electronic device (e.g. an amplifier, etc.), or an optical device (e.g. a laser diode chip, etc.) may be located. FIG. 11 illustrates the device 255 as being located in the sub-region 39A. If the device 255 is connected to a conductor 257, the conductor 257 can also be passed through the channel 220.

The slider trailing edge 130 may optionally include one or more horizontal channels (or second channels) 260, 261 (shown in dashed lines) formed in the front side of the slider 200. These horizontal channels 260, 261 are formed at an angle relative to the vertical channel 220. At least one of the horizontal channels 260, 261 may be connected to the vertical channel 220. Though FIG. 11 illustrates the two horizontal channels 260, 261 as being normal to the vertical channel 220, it should be understood that other channels and angle values may be selected. One or more horizontal channels, for example channel 260 shown in FIG. 13 extend along part or the entire length of the slider side or sides 269, to the slider overside 131, toward the load beam 204. The width of the channels 260, 261 may vary according to the desired application.

FIG. 10 illustrates the slider 200 as being positioned longitudinally or radially relative to the load beam 204. The suspension 202 and the longitudinally positioned slider 200 of FIG. 10 can be used in a rotary actuator or Winchester type head gimbal assembly. The suspension 202 and the laterally positioned slider 200 of FIG. 9 can be used in a linear actuator type head gimbal assembly.

Figure 14:
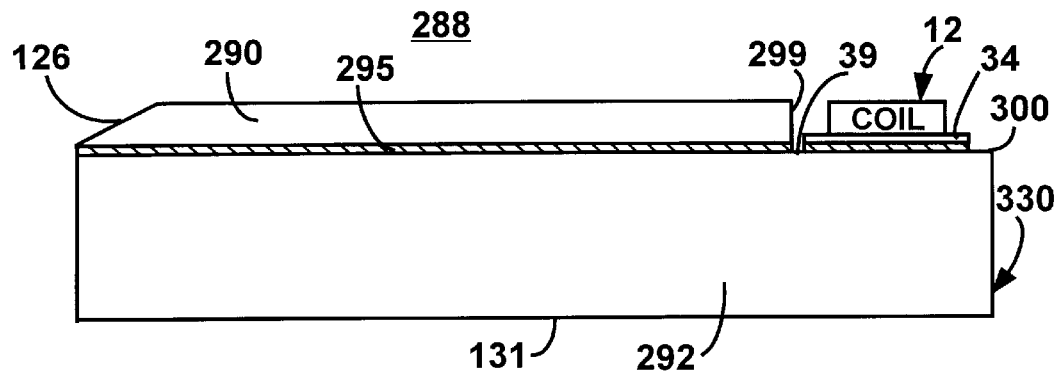
FIG. 14 is a side elevational view of a modular slider according to yet another embodiment of the present invention.
Figure 15:
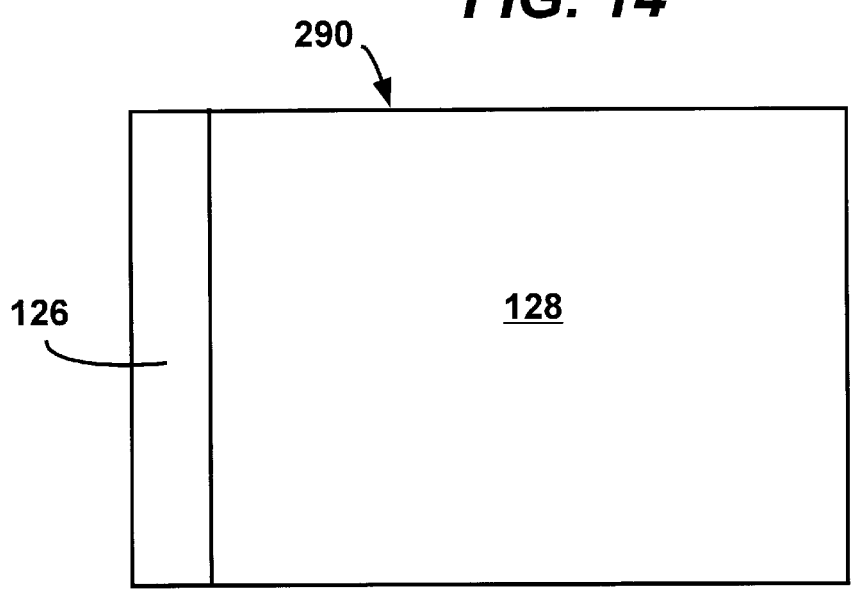
FIG. 15 is a top plan view of an upper slider section forming part of the modular slider of FIG. 14.
Figure 16:
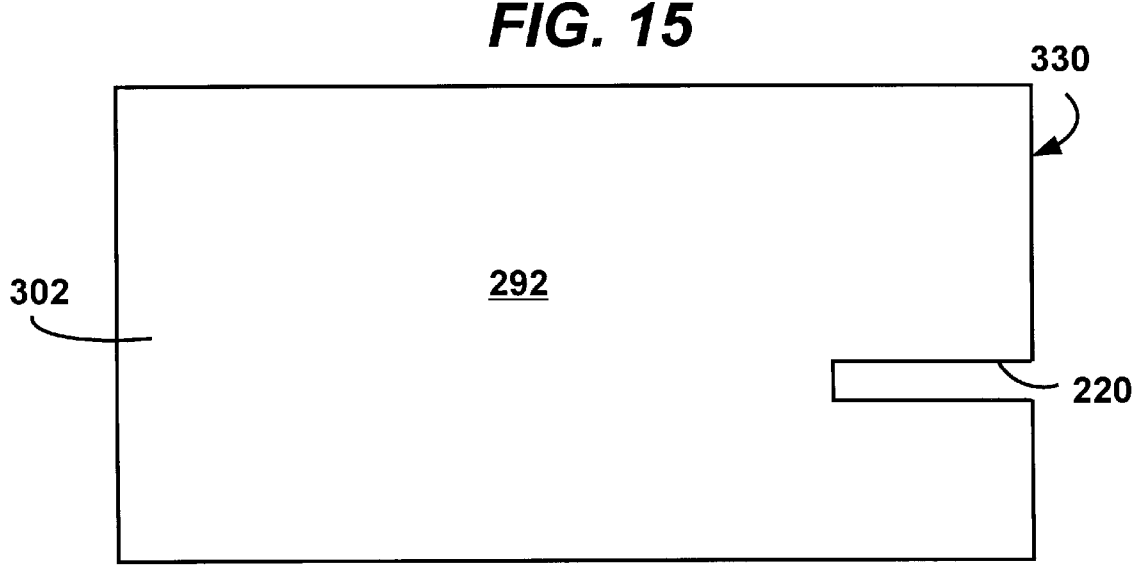
FIG. 16 is a top plan view of a lower slider section forming part of the modular slider of FIG. 14.

FIG. 14 illustrates a modular slider 288 according to another embodiment of the present invention. The slider 288 is formed of an upper section 290 and a lower section 292, secured together by available techniques, such as an adhesive layer 295. The upper slider section 290 may optionally be thinner than the lower slider section 292. The upper slider section 290 includes the taper 126 at the slider leading edge 127 and the flat air bearing surface 128. The recessed region 39 is defined by the trailing edge 299 of the upper slider section 290 and the top surface 300 of the lower slider section 292. The upper slider section 290 may be formed separately from the slider lower section 292. FIG. 15 is a top plan view of the upper slider section 290. FIG. 16 is a top plan view of the slider lower section 292. The slider lower section 292 is basically a block 302 with the vertical channel 220 formed at its trailing edge 330.

It should be understood that the geometry, compositions, and dimensions of the elements described herein may be modified within the scope of the invention. In addition, while the coil assembly 12 has been described in connection with disk drives, it should be clear that the coil assembly 12 may alternatively be used in various other applications, including but not limited to antennas for wireless communications (i.e., cellular telephones), microelectromechanical sensors (MEMS), miniaturized inductors for generation of motion, magnetic storage devices, transformers, etc. Furthermore, while the slider is described in connection with an optical or MO data storage systems, it is clear that it can be used with other magnetic or other data storage systems.

What is claimed is:

1. A slider for use in optical or magneto optical data storage system, for supporting a device, comprising:

an underside including an air bearing surface and a recessed region;

said recessed region receiving the device without significantly affecting the aerodynamic characteristic of said air bearing surface;

a leading edge, and a trailing edge having a width;

a channel extending from the recessed region along substantially the entire depth of the trailing edge; and wherein said recessed region is located along substantially the entire width of said trailing edge.

2. A slider according to claim 1, wherein said air bearing surface is substantially flat.

3. A slider according to claim 1, wherein said air bearing surface further includes at least one side rail.

4. A slider according to claim 1, wherein the device includes an underside; and wherein said device underside is substantially flush relative to said air bearing surface.

5. A slider according to claim 1, wherein said underside further includes a taper; and wherein the width of said taper is approximately 15 mils;

wherein the width of said recessed region is approximately 39 mils; and wherein the depth of said recessed region is approximately 3.5 mils.

6. A slider according to claim 1, wherein the device includes a conductor that extends along said recessed region.

7. A slider according to claim 1, wherein the device includes a conductor that extends along said channel.

8. A slider according to claim 7, further including a second channel formed at an angle relative to said channel.

9. A slider according to claim 1, wherein said air bearing surface is patterned.

10. A slider according to claim 1, wherein the device includes a magnetic assembly.

11. A slider according to claim 1, wherein the device includes an electro-magnetic assembly.

12. A slider according to claim 1, wherein the device includes an electronic component.

13. A slider according to claim 1, wherein the device includes an amplifier.

14. A slider according to claim 1, wherein the channel divides said trailing edge into two sub-regions.

15. A slider according to claim 14, wherein the device is secured to one said two sub-regions; and wherein said conductor extends through said channel.

* * * * *